United States Patent [19]

Schneider et al.

[11] Patent Number: 5,023,793
[45] Date of Patent: Jun. 11, 1991

[54] APPARATUS AND METHOD FOR DYNAMIC COMPENSATION OF A PROPELLER PITCH SPEED CONTROL GOVERNOR

[75] Inventors: Roy W. Schneider, Ellington; David E. Leenhouts, Windsor Locks, both of Conn.

[73] Assignee: United Technologies Corporation, Hartford, Conn.

[21] Appl. No.: 335,901

[22] Filed: Apr. 10, 1989

[51] Int. Cl.$^5$ .............................. B64C 27/57; B64C 11/00
[52] U.S. Cl. .............................. 364/431.02; 364/433; 416/27; 416/46; 290/44
[58] Field of Search ............... 364/440, 431.02, 433, 364/434, 439, 431.01; 244/180, 181, 182, 69, 17.11, 65, 66; 416/33, 35, 129, 43, 48, 46, 157 R, 27; 290/66, 44

[56] References Cited

U.S. PATENT DOCUMENTS

| | | | |
|---|---|---|---|
| 2,669,312 | 2/1954 | Dinsmore et al. | 416/35 |
| 4,209,152 | 6/1980 | Stephan | 244/182 |
| 4,442,490 | 4/1984 | Ross | 364/434 |
| 4,488,235 | 12/1984 | Miller | 364/434 |
| 4,533,295 | 8/1985 | Duchesneau | 416/27 |
| 4,588,354 | 5/1986 | Duchesneau et al. | 416/48 |
| 4,639,192 | 6/1987 | Harrell | 416/27 |
| 4,648,797 | 3/1987 | Martin | 416/43 |
| 4,656,362 | 4/1987 | Harner et al. | 416/43 |
| 4,671,736 | 6/1987 | Finnigan | 416/48 |

*Primary Examiner*—Michael R. Fleming
*Assistant Examiner*—Ayaz R. Sheikh
*Attorney, Agent, or Firm*—Ronald R. Snider

[57] ABSTRACT

Governor stability of a propeller pitch controlled speed governor is improved by dynamically compensating a turbine engine speed error signal employed in determining fuel flow. The fuel flow requirement is a function of the dynamically compensated turbine engine speed error signal, an indicated air speed signal, and a power lever angle signal.

13 Claims, 2 Drawing Sheets

APPARATUS AND METHOD FOR DYNAMIC COMPENSATION OF A PROPELLER PITCH SPEED CONTROL GOVERNOR

DESCRIPTION

1. Technical Field

This invention relates to the dynamic control of a turbine engine propeller propulsion where propeller pitch is changed to yield a desired change in propeller speed. Dynamic compensation of a propeller pitch controlled speed governor is provided by modification of engine power control.

2. BACKGROUND ART

It has been known in the prior art that aircraft propulsion systems utilizing propellers must simultaneously control engine power and propeller speed. When an aircraft is operating on the ground, engine power is controlled by propeller pitch, and propeller speed is controlled by adjusting engine fuel. When the aircraft is in flight, it is common to control engine power by control of engine fuel, and to control propeller speed by controlling propeller pitch.

It is also known in the art to provide full authority digital electronic control (FADEC) for control of the engine. This digital electronic control includes substantially all of the input and output information required for control and compensation of the turbine-propeller combination.

The reason engine fuel is required for control on the ground is that power cannot be decreased on the ground when the blade is at flat pitch because any pitch change will decrease, not increase the speed, because more power will be absorbed.

A typical in flight propeller speed control adjusts propeller pitch to yield a desired propeller speed. This type of pitch control is usually an integral control where the propeller pitch rate is proportional to measured propeller speed error. This type of propeller speed control has marginal stability at some flight conditions because the dynamic lag associated with the polar moment of inertia of the propeller plus engine power turbine varies with flight conditions.

Dynamic compensation for the propeller speed control is usually provided to improve propeller speed governing stability. The dynamic compensation modifies the control laws that define how the propeller speed error modulates propeller pitch. Dynamic compensation should be varied as a function of flight conditions and engine power to yield optimum speed governing dynamic characteristics. However, the typical propeller control of the prior art utilizes a constant value of dynamic compensation which is significantly different from the optimum dynamic compensation at most operating conditions.

If dynamic compensation is to be provided by propeller controls in the prior art, a significant increase in hardware complexity will be needed in the propeller speed governor unit to provide near-optimum dynamic performance for a range of operating conditions. This is required because in controls which lack a full authority digital electronic control additional commands and controls must be designed into the system.

Prior art dynamic compensation for the propeller speed governor is mechanized in various ways, but all result in providing dynamic compensation by causing the propeller pitch to move in proportion to the propeller speed error.

DISCLOSURE OF THE INVENTION

The compensation provided by this invention yields a change in propeller torque proportional to the propeller speed error. The engine power turbine torque is varied in proportion to the engine power turbine speed.

This invention utilizes the engine fuel control to modulate engine power to provide dynamic compensation for the propeller pitch control speed governor. A typical engine control is a full authority digital electronic control (FADEC) which already contains essentially all information needed to yield near-optimum dynamic compensation over the complete operating range of the engine. There are no additional FADEC inputs or output interfaces required for this invention. Dynamic compensation is implemented in FADEC software which requires a minimal amount of hardware. This dynamic compensation eliminates the need for dynamic compensation in the propeller pitch control and eliminates a significant amount of hardware.

This invention provides a more nearly optimum dynamic compensation for the propeller pitch speed governor, and accomplishes this improvement with reduced hardware complexity. This invention uses the full authority digital electronic control (FADEC) to implement the change in engine power.

Since the propeller is driven by the power turbine through the speed reduction gear, it is apparent that the engine power turbine torque versus engine power turbine speed dynamic compensation has an effect which is similar to the propeller torque versus propeller speed constant value dynamic compensation used in the present art.

An object of this invention is to provide dynamic compensation of a propeller speed governor which varies in accordance with engine operating conditions and flight conditions.

It is another object to provide dynamic compensation to the propeller pitch control speed governor for the purpose of improving its governing stability.

The compensation provided for the propeller pitch control speed governor is determined by the dynamics of the turbine engine and propeller. Power changes for compensation may be controlled by the fuel control or the power lever angle (PLA). When PLA is selected, a proportional gain which is the change in PLA with change in power turbine speed may be selected.

BEST MODE FOR CARRYING OUT THE INVENTION

In this invention, the FADEC (full authority digital electronic control) is a term which is used to describe a particular control as designed by the General Electric Company. However, any separate electronic engine control (EEC) may be used with this invention. This invention provides for compensation of the propeller speed governor, and can be integrated into the software of any suitable electronic engine fuel control. The control provides for control by the power lever angle and it is by adjustment of power lever angle that the pitch speed control governor is compensated.

Engine power turbine torque versus speed dynamic compensation has the same basic effect as the propeller torque versus propeller speed dynamic compensation used in the present art because the power turbine is connected through the speed reduction gear to the propeller.

Figure 1:
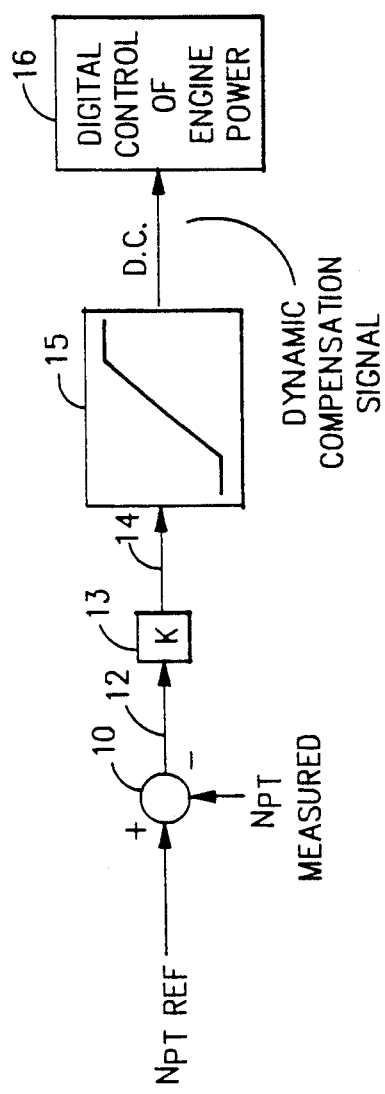
FIG. 1 shows dynamic compensation applied to an electronic engine fuel control.

This invention provides for dynamic compensation of the propeller speed governor as generally shown in FIG. 1. A power turbine reference speed $N_{PT\text{-}REF}$ is provided to summing junction 10 along with measured power turbine speed, $N_{PT}$. The difference signal in line 12 is sent to a partial control law device 13. The value of the proportional gain K is a function of the change in power lever angle (PLA) with a change in propeller speed (DELTA $N_p$).

The output proportional control law signal on a line 14 is fed to a means 15 for imposing authority limits on the dynamic compensation signal. The dynamic compensation signal, upon exiting the authority limit 15, is applied to digital control 16 which controls engine power. The digital control 16 may also be an electronic engine control (EEC) or a full authority digital electronic control known as (FADEC).

Figure 3:
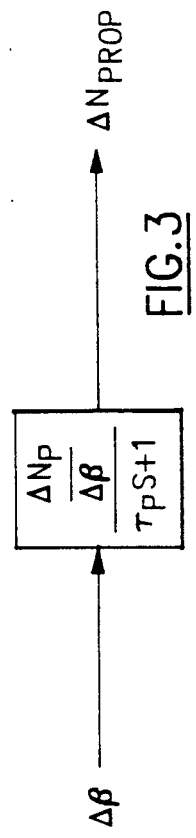
FIG. 3 shows a simplified linearized block diagram of the power turbine-propeller model shown in FIG. 2.
Figure 4:
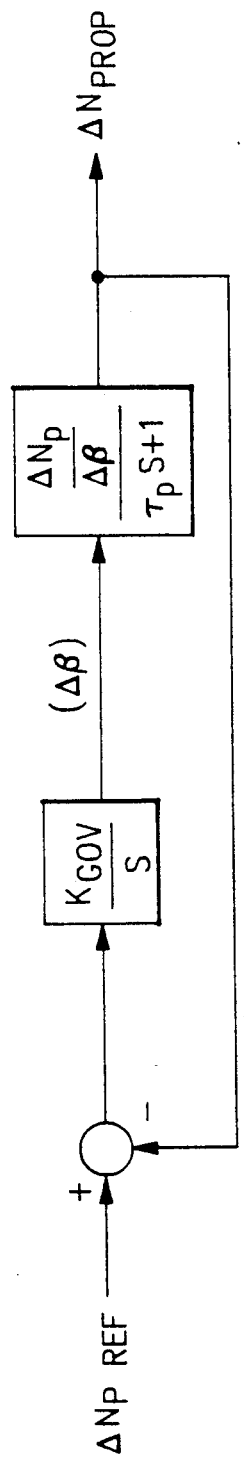
FIG. 4 is a simplified linearized block diagram of the model in FIG. 2.

In FIG. 1, the proportional control law K (13) is determined from the parameters of the propeller speed governor to be compensated. An example of the determination of the constant K is shown in FIGS. 2, 3, and 4.

Figure 2:
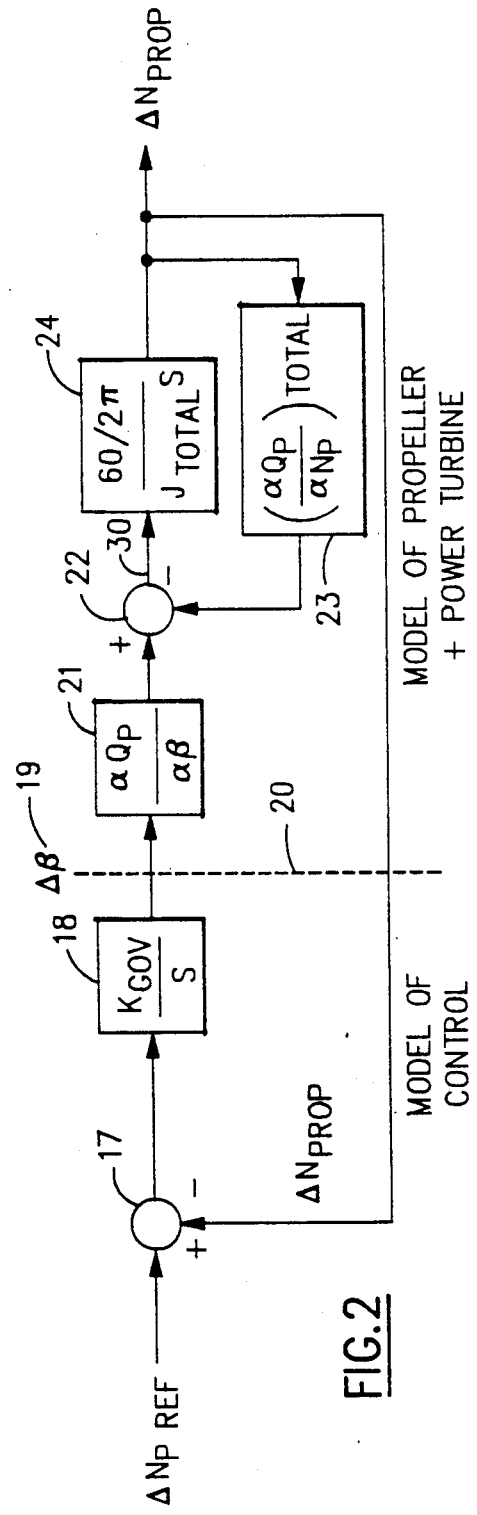
FIG. 2 shows a linearized block diagram of a speed governor and of a power turbine-propeller combination.

A simplified linearized block diagram of a typical propeller speed governor is shown in FIG. 2. This conventional governor provides speed governoring for the propeller by changing the propeller pitch. This device is typical of those now in use, and is but one governor which may be compensated by use of this invention. At summing junction 17, subtraction of the change in propeller speed from a change in propeller speed reference occurs. The block 18 is the propeller speed governor and is represented by the general term $K_{gov} \div S$. The denominator term, s, in block 18 is the conventional Laplace Transform variable, which states that the governor control law is an integral control. The output of the governor 18 is a change in blade angle position DELTA B 19. The entire propeller speed governor control is depicted by reference numerals 17, 18 and 19.

To the right-hand side of the dashed line depicted generally at 20 of FIG. 2, there is shown a model of the propeller and power turbine. In block 21 there is shown the change in propeller torque with respect to change in blade angle or partial derivative of $Q_p$ with respect to partial derivative of blade angle BETA. The output of block 21 is then applied to summing junction 22. A feedback from the change in propeller speed DELTA $N_{prop}$ is sent to block 23. At block 23, the total change in torque delta $Q_p$ is taken with respect to change in propeller speed delta $N_p$. The output from block 23 is subtracted at the summing junction 22. Summing Junction output signal on a line 30 is the torque available to accelerate or decelerate the polar moment of inertia, $J_{total}$.

At block 24 there is shown the effect of the total polar moment of inertia of the propeller, the gear box, and power turbine. The $J_{total}$ represents the total polar moment of inertia referred to the propeller shaft. The computation of the value of $K_{Gov}$ or governor gain required for FIGS. 2, and 4 is demonstrated in equations 1-11 below.

The model of the propeller plus power turbine portion of FIG. 2 can be rearranged as shown in FIG. 3. In this example, the change in propeller speed divided by the change in BETA is shown below:

$$\frac{\Delta N_p}{\Delta \beta} = \frac{\left(\frac{\partial Q_p}{\partial \beta}\right)}{\left(\frac{\partial Q_p}{\partial N_p}\right)_{TOTAL}} \quad \text{EQUATION 1}$$

Also, $Tau_p$ in FIG. 3 is represented as follows:

$$\tau_p = \frac{\frac{2\pi}{60} J_{TOTAL}}{\left(\frac{\partial Q_p}{\partial N_p}\right)_{TOTAL}} \quad \text{EQUATION 2}$$

FIG. 4 shows the linearized block diagram of the propeller speed governor with the model of the propeller and power turbine as represented in FIG. 3.

The transfer function of the block diagram of FIG. 4 is as follows:

$$\frac{\Delta N_{PROP}}{\Delta N_{PREF}} = \frac{1}{\left[\frac{\tau_p}{K_{GOV}\left(\frac{\Delta N_p}{\Delta \beta}\right)}\right]S^2 + \left[\frac{1}{K_{GOV}\left(\frac{\Delta N_p}{\Delta \beta}\right)}\right]S + 1} \quad \text{EQUATION 3}$$

Equation 3 is a quadratic and it can be expressed as:

$$\left(\frac{S}{W_n}\right)^2 + 2z\left(\frac{S}{W_n}\right) + 1 \quad \text{EQUATION 4}$$

In this equation, $W_n$ is the natural frequency, and z is the damping ratio. Therefore:

$$W_n = \left[\frac{K_{GOV}\left(\frac{\Delta N_p}{\Delta \beta}\right)}{\tau_p}\right]^{\frac{1}{2}} \quad \text{EQUATION 5}$$

$$z = \frac{1}{2\left[K_{GOV}\left(\frac{\Delta N_p}{\Delta \beta}\right)(\tau_p)\right]^{\frac{1}{2}}}$$

After this analysis, it can be seen that a propeller speed governor as now used can be improved or compensated in a number of ways. First, the governor stability can be improved by increasing the damping ratio (z) as shown by the characteristic quadratic above. Second, the damping ratio can be increased by decreasing $TAU_p$ and/or DELTA $N_p$ divided by DELTA BETA. Third, both $TAU_p$ and DELTA $N_p$ divided by DELTA BETA can be decreased by increasing the effective value of the change in propeller torque with change in propeller speed:

$$\frac{\partial Q_p}{\partial N_p} \qquad \text{EQUATION 6}$$

The effective value of the change in propeller torque $Q_p$ with the change in propeller speed $N_p$ can be increased by adding control laws to provide change in propeller torque with respect to change in propeller speed DELTA $N_p$ so that:

$$\left(\frac{\partial Q_p}{\partial N_p}\right)_{EFFECTIVE} = \left(\frac{\partial Q_p}{\partial N_p}\right)_{TOTAL} + \left(\frac{\partial Q_p}{\partial N_p}\right)_{CONTROL} \qquad \text{EQUATION 7}$$

Referring now back to FIG. 1, block 13, it is seen that the value of the gain K must be determined. K is determined in the following three steps.

Step 1: A value of the governing damping ratio (z) is selected to satisfy the specified governing stability criteria.

Step 2: is computation of the change in propeller torque with respect to the change in propeller speed-control that will yield the desired damping ratio (z) where:

$$\tau_p = \frac{\frac{2\pi}{60} J_{TOTAL}}{\left(\frac{\partial Q_p}{\partial N_p}\right)_{TOTAL} + \left(\frac{\partial Q_p}{\partial N_p}\right)_{CONTROL}} \qquad \text{EQUATION 8}$$

Step 3: compute the proportional gain (k) needed to yield the change in propeller torque with respect to the change in propeller speed-control.

Since DELTA torque propeller divided by DELTA speed propeller is the change in torque at the propeller resulting from a commanded change in power lever angle (PLA), then $$\left(\frac{\partial Q_p}{\partial N_p}\right)_{CONTROL} = \frac{\Delta PLA}{\Delta N_p}\left(\frac{\Delta Q_p}{\Delta PLA}\right) \qquad \text{EQUATION 9}$$

Figure 5:
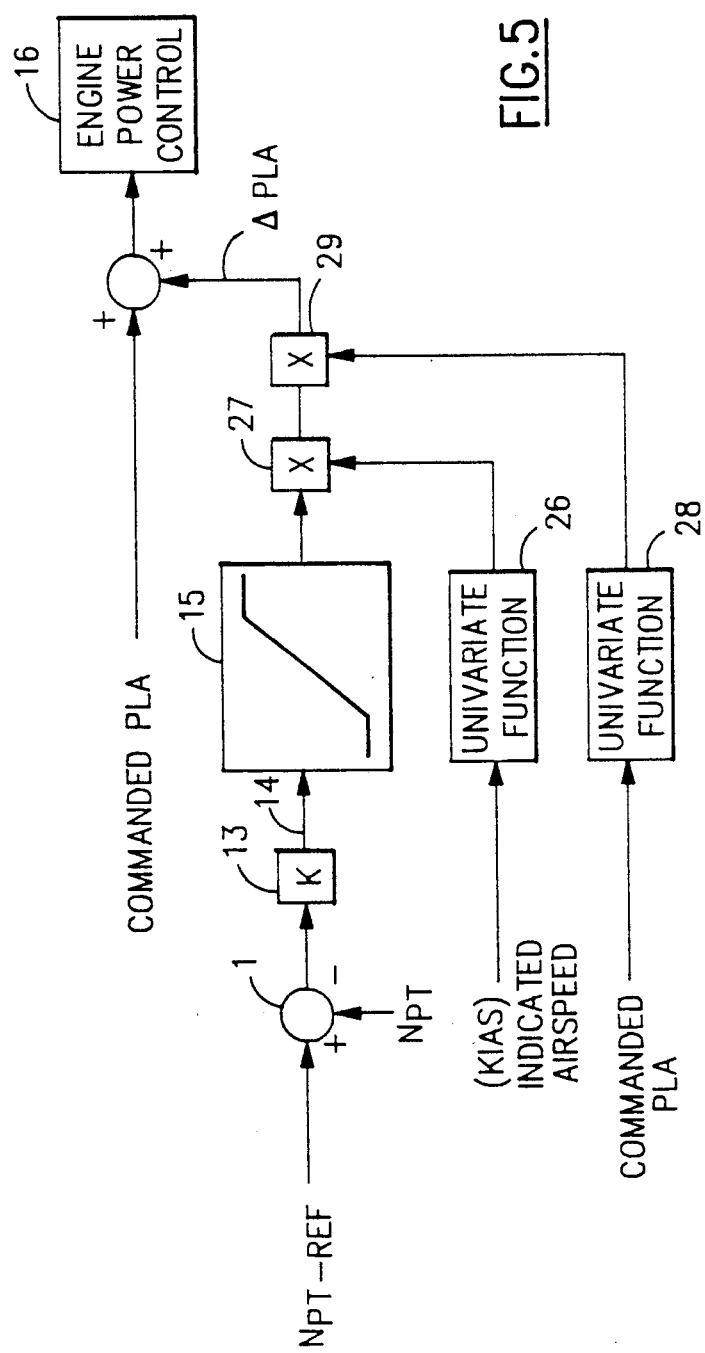
FIG. 5 shows a modification of the dynamic compensation of FIG. 1 where there is additional compensation as a function of commanded engine power and flight conditions.

Therefore gain (k) is as follows:

$$K = \frac{\Delta PLA}{\Delta N_p} = \frac{\left(\frac{\partial Q_p}{\partial N_p}\right)_{CONTROL}}{\frac{\Delta Q_p}{\Delta PLA}} \qquad \text{EQUATION 10}$$

Where Delta PLA divided by Delta $N_p$ is the proportional gain K which is the change in PLA with change in propeller speed Referring now to FIG. 5, summing junction 1, shows the summation of the reference speed of the power turbine, and a measured speed of the power turbine. The proportional control law K at block 13, the authority limits at block 15, and the engine power control 16 are all the same as that depicted in FIG. 1. FIG. 5 also provides for the varying of dynamic compensation as a function of engine power and flight conditions to yield a near-optimum dynamic compensation for the range of operating conditions. Indicated air speed (KIAS) 25 is applied to the univariate function block 26 and then applied to the multiplier block 27. Similarly, commanded power lever angle (PLA) is applied to univariate function block 28 and to multiplier block 29.

In this example, control is achieved by a modification of the commanded power lever angle. However, it should be recognized that any signal that ultimately influences engine power turbine torque may be used. Also, as FIG. 5 shows the use of both indicated air speed (KIAS), and power lever angle (PLA) scheduling of the dynamic compensation, it should be recognized that other methods exist for scheduling this dynamic compensation to yield near-optimum dynamic performance.

Alternate forms of the proportional control law (block 13) exist. For example the following expression can be substituted for K $$\frac{K\tau S}{\tau S + 1} \qquad \text{EQUATION 11}$$

Tau must be sufficiently large to yield a proportional control at the frequency requiring dynamic compensation.

Although the invention has been shown and described with respect to a best mode embodiment thereof, it should be understood by those skilled in the art that the foregoing and various other changes, omissions and deletions in the form and detail thereof may be made therein without departing from the spirit and scope of this invention.

I claim:

1. Apparatus, for improving a performance stability of a speed governor of a variable pitch control for a propeller driven aircraft having a gas turbine engine with an electronic fuel control for regulating fuel flow to the gas turbine in dependance on a set point value of a power lever angle controlled by an operator, comprising:
    sensor means, for providing sensed signals indicative of turbine engine speed, aircraft air speed, and power lever angle setting;
    signal summing means, for providing a turbine engine speed error signal as a difference magnitude between said turbine engine speed signal and a reference turbine engine speed signal presented thereto;
    signal processing means, responsive to said turbine engine speed error signal, and having memory means for storing signals including program signals defining an executable algorithm for multiplying said turbine engine speed error signal by a proportional gain signal to provide a dynamic compensation signal; and
    signal multiplying means, for presenting a fuel control signal, as a product magnitude of said air speed signal, said dynamic compensation signal, and said power lever angle signal, to the electronic fuel control to control the gas turbine engine torque and, thereby controlling propeller torque.

2. Apparatus according to claim 1 further comprising, means for limiting the signal magnitude of said dynamic compensation signal to predetermined upper and lower values.

3. Apparatus according to claim 1 wherein said multiplying means provides, to the fuel control, an enhanced fuel control signal equal to a sum magnitude of said fuel control signal and said power lever angle signal.

4. Apparatus according to claim 1 wherein said proportional gain is a function of a change in the power lever angle with a change in propeller speed.

5. Apparatus according to claim 1 wherein said proportional gain is defined by a following proportional control law:

$$\frac{K\tau S}{\tau S + 1}$$

where K is a change in the power lever angle divided by a change in propeller speed $\tau$ is a predetermined time lag, and S is a Laplace Transform variable.

6. Apparatus according to claim 5 wherein said predetermined time lag is sufficiently large to yield proportional control at frequencies where dynamic compensation is desired.

7. Apparatus according to claim 5 wherein said proportional gain approaches K as frequencies increase above where dynamic compensation is desired.

8. A method for controlling propeller torque to improve governor stability of a propeller pitch control speed governor of an aircraft having a gas turbine engine with a variable pitch propeller comprises:
   detecting a turbine engine speed to provide a turbine engine speed signal, an air speed of the aircraft to provide an air speed signal, and a power level angle position to provide a power level angle signal;
   summing said turbine engine speed signal with a reference turbine engine speed signal to provide a turbine engine speed error signal;
   dynamically compensating said turbine engine speed error signal by a proportional gain to provide a dynamic compensation signal;
   multiplying said dynamic compensation signal with said air speed signal and with said power level angle signal to provide a fuel control signal; and
   controlling propeller torque with said fuel control signal.

9. The method according to claim 8 further comprises, limiting said dynamic compensation signal by an upper predetermined limit and a lower predetermined limit.

10. The method according to claim 8 wherein said proportional gain is a function of a change in the power lever angle with a change in propeller speed.

11. The method according to claim 8 wherein said proportional gain is defined by a following proportional control law:

$$\frac{K\tau S}{\tau S + 1}$$

where K is a change in the power lever angle divided by a change in propeller speed, $\tau$ is a predetermined time lag, and S is a Laplace Transform variable.

12. The method according to claim 11 wherein said predetermined time lag is sufficiently large to yield proportional control at frequencies where dynamic compensation is desired.

13. The method according to claim 11 wherein said proportional gain approaches K as frequencies increase above where dynamic compensation is desired.

* * * * *